Oct. 20, 1942.  A. T. SMOLA  2,299,185

TIRE CHAIN MOUNTER

Filed Feb. 19, 1940

INVENTOR.
ANDREW T. SMOLA
BY
Saywell & Wessler,
ATTORNEYS.

Patented Oct. 20, 1942

2,299,185

UNITED STATES PATENT OFFICE 2,299,185

TIRE CHAIN MOUNTER

Andrew T. Smola, Cleveland, Ohio, assignor to The Cleveland Chain & Manufacturing Company, Cleveland, Ohio, a corporation of Ohio Application February 19, 1940, Serial No. 319,617

3 Claims. (Cl. 81—15.8)

This invention, as indicated, relates to a tire chain mounter. More particularly, it comprises a spring steel strip having hooked shape terminals at the ends thereof adapted to be engaged with the end links of the side chains of a non-skid chain unit after such device has been engaged with an automobile tire to which the chain is to be applied, and through the rotation of the wheel in a forward direction, preferably, to draw such non-skid chain unit over the wheel into a position permitting said chain ends to be joined in the conventional manner after the removal of the spring steel mounting device.

Heretofore it has been proposed to apply non-skid chain units to automobile wheels with various types of clamping devices, but such means as were provided were not adapted to fit a series of tire sizes satisfactorily, or involved clamping adjustments which could be made only with difficulty because of the inaccessible position of the tire surface to which the device was to be applied, or had movable parts which were subject to being clogged with mud or snow. A number of such devices were permanently attached to the non-skid chain units and were objectionable as not permitting free action of such unit.

The principal object of the present invention is to provide a device of a light and simple character adapted to be temporarily engaged over the tire of an automobile to which a non-skid chain unit is to be applied, and to be removed after such chain is carried about the wheel circumference so that the chain ends may be attached in the conventional manner with the side chain locking devices.

Another object of the invention is to provide a tire chain mounter of a construction peculiarly adapted to hold firmly to the outer surface of the tire to which it is applied wherein the pull of the side chains upon such device will be of a character to increase the gripping capacity of such unit.

Another object of the invention is to provide a tire chain mounter having elements at its sides to bear in gripping relation against the tire walls so as to increase the frictional engagement of the device with the tire and prevent its accidental displacement while being rotated with the wheel.

A further object of the invention is to provide a tire chain mounter having a plurality of gripping elements adjacent the side walls of the tire adapted to be brought into greater frictional contact with the tire through the pull of the side chains of the non-skid chain unit being applied to the tire.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain structures embodying the invention, such disclosed means constituting, however, but several of various forms in which the principle of the invention may be used.

Figure 1:
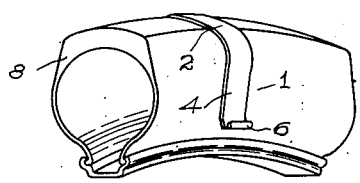
Fig. 1 is a perspective view showing a tire chain mounter embodying the principles of the invention, applied about the circumference of an automobile tire.
Figure 2:
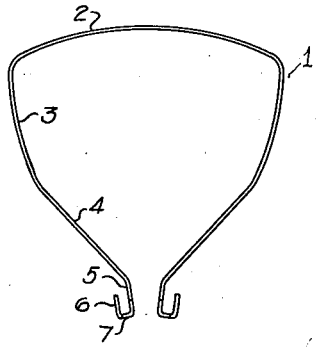
Fig. 2 is an end elevation of a tire chain mounter embodying the principles of the invention showing the same in the form it assumes when not under tension.
Figure 3:
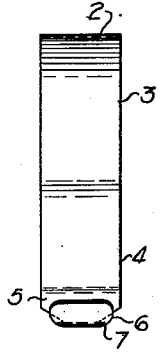
Fig. 3 is a side elevation of the structure shown in Fig. 2.
Figure 4:
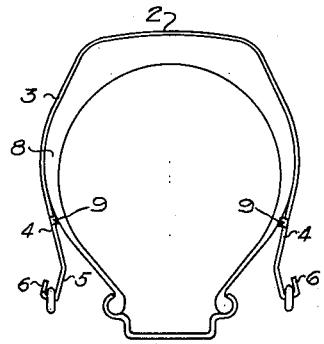
Fig. 4 is an end view of a tire chain mounter of the type shown in Figs. 1 to 3, inclusive, but having in addition lateral gripping lugs and shown in the position assumed by such structure when applied to an automobile tire shown in cross section.

As is clearly shown in Figs. 1 to 3 of the drawing, the tire chain mounter 1 is preferably formed of a strip of sheet metal in strip form shaped so as to provide a somewhat flattened central arcuate portion 2 with downwardly and inwardly inclined curved side portions 3 merging with downwardly and inwardly inclined straight portions 4, having lower end portions 5 turned in an outward direction and shaped to provide terminal hooks 6 with recesses or notches 7 within which the links of the side chains are adapted to engage. A structure of the type set forth when applied to a tire chain will assume a shape substantially equivalent to that disclosed in Fig. 4. Such device is adapted to fit tires of a number of different diameters, and will have a slightly different angular position on its lower ends when applied to different tire sizes, but such variation and position will not affect the gripping capacity of the device. It will be noted that the hooks 6, as shown in Fig. 4, are slightly inwardly of the point of largest transverse diameter of the tire 8, and that a pull on the hooks will cause increased gripping action of the lateral portion of the device. This gripping action will be appreciably increased through the position of gripping lugs 9 at an intermediate point on the straight section 4 of the device, such lugs thus engaging the side walls of the tire at a point below the point of greatest transverse diameter of the tire 8, and the gripping action being enhanced through force exerted upon the hook terminals of the construction.

Figure 7:
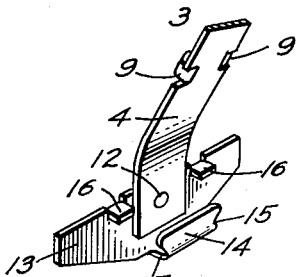
Fig. 7 is an enlarged perspective view of one of the gripping plates shown in Figures 5 and 6.
Figure 5:
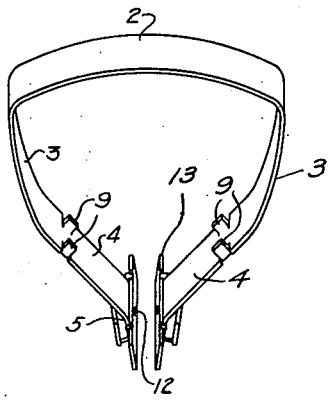
Fig. 5 is a perspective view of a modified form of tire chain mounter disclosing pivoted gripping members associated with the terminal members of the structure.
Figure 6:
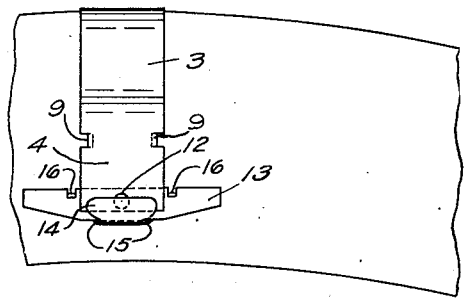
Fig. 6 is a side elevation of the structure shown in Fig. 5 as applied to an automobile tire.

In addition to the modified form shown in Fig. 4, the construction shown in Figs. 5, 6, and 7 provides for a body member of the tire heretofore described, such member comprising a flat strip having portions similar to those heretofore described in connection with Figs. 1 to 3 and bearing similar reference characters, but at the lower ends having long plates mounted on the downwardly turned lower portions of such device, said ends having pivot holes therethrough with pivot pins 12 securing gripping plates 13 to the inner faces thereof, each gripping plate 13 having central outwardly and upwardly extending portions providing a terminal hook 14 with a side chain link receiving recess 15 at each side thereof. The gripping plates may be formed with outwardly turned lugs 16 on its upper edge in slightly spaced relation to the body portion of the device so as to provide means limiting the degree of pivotal movement of such gripping plates. Thus a pull of the chain upon a pivoted terminal will cause the plate to rock about its pivot and the end adjacent the direction of pull to press against the tire walls and maintain the frictional engagement of the device with the tire surface.

The device just described, in addition to having the gripping plates at the lower ends thereof, may also be provided with the gripping lugs 9, heretofore described in connection with the modification shown in Fig. 4.

Other modes of applying the principle of my invention may be employed instead of those explained, change being made as regards the structure herein disclosed, provided the means stated by any of the following claims or the equivalent of such stated means be employed.

I therefore particularly point out and distinctly claim as my invention:

1. A tire chain mounter device comprising a body member formed of a strip of spring metal and conforming in outline substantially to the cross-section of a tire casing, outwardly offset curved T-shape hook members at the ends of said strip for temporary engagement with the respective side chain links adjacent the end of a non-skid chain unit, and integrally formed spaced inwardly extending pairs of gripping lugs providing intermediate bearing areas on the side portions of said body members subject to increasing frictional pressure against the lower side walls of the tire in response to the pull of said side chains in the course of applying said unit around the tire circumference.

2. A tire chain mounter device comprising a body member formed of a strip of spring metal and conforming in outline substantially to the cross-section of a tire casing, outwardly offset curved T-shape hook members at the ends of said strip for temporary engagement with the respective side chain links adjacent the end of a non-skid chain unit, integrally formed spaced inwardly extending gripping lugs providing side wall contacting extensons formed on the body member integrally with said hook members and subject to increasing frictional pressure against the lower side walls of the tire in response to the pull of said chains in the course of applying said unit around the tire circumference.

3. A tire chain mounter device comprising a body member formed of a strip of spring metal and conforming in outline substantially to the cross-section of a tire casing, outwardly offset curved T-shape hook members at the ends of said strip for temporary engagement with the respective side chain links adjacent the end of a non-skid chain unit, and tire contact lugs struck-up inwardly from each of the side portions of said body member above said hook members respectively, and subject to increasing frictional pressure against the lower side walls of the tire in response to the pull of said chains in the course of applying said unit around the tire circumference.

ANDREW T. SMOLA.